United States Patent [19]
Vik

[11] 3,796,074
[45] Mar. 12, 1974

[54] LOCK FOR TRAILER HITCH COUPLER NUT

[75] Inventor: Albam M. Vik, New Brighton, Minn.

[73] Assignee: Dempco, Inc., Minneapolis, Minn.

[22] Filed: Aug. 10, 1972

[21] Appl. No.: 279,648

[52] U.S. Cl.................. 70/231, 70/223, 280/507
[51] Int. Cl................... B60d 1/12, F16b 41/00
[58] Field of Search....... 70/221, 223, 231; 280/507

[56] References Cited
UNITED STATES PATENTS
1,767,643   6/1930   Baird .................................... 70/231
2,111,511   3/1938   Lowe et al............................. 70/221
3,492,023   1/1970   Thompson.......................... 280/507

Primary Examiner—Albert G. Craig, Jr.
Attorney, Agent, or Firm—Ralph L. Rugger

[57] ABSTRACT

A lock for a trailer hitch coupler nut which can be used on couplers for trailer hitches to prevent the theft of a trailer when the trailer is connected to a towing vehicle, or is disconnected from the towing vehicle. The coupler nut has lockable elements that when locked prevent the nut from being turned to loosen the coupler.

9 Claims, 7 Drawing Figures

PATENTED MAR 12 1974 3,796,074

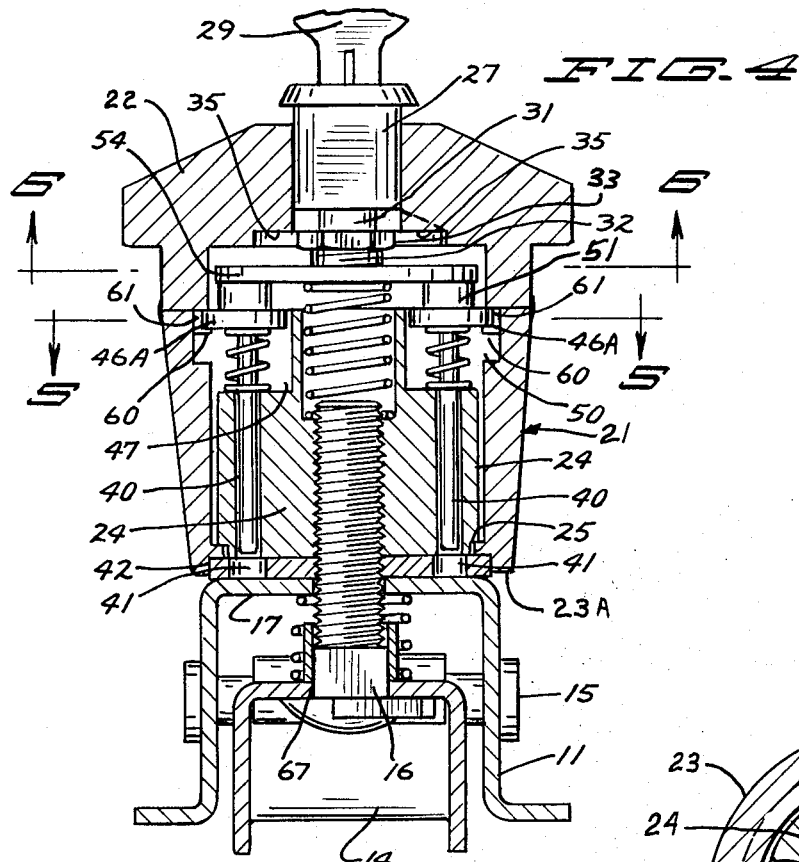
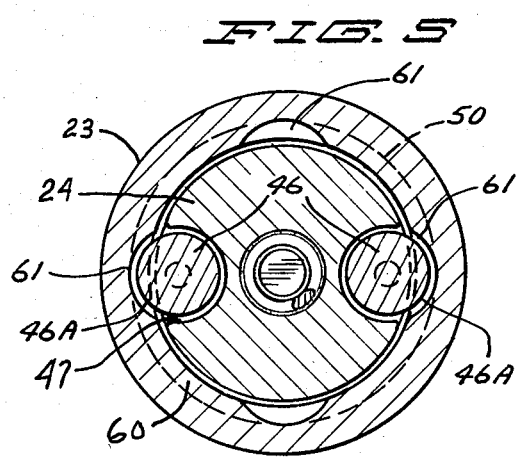
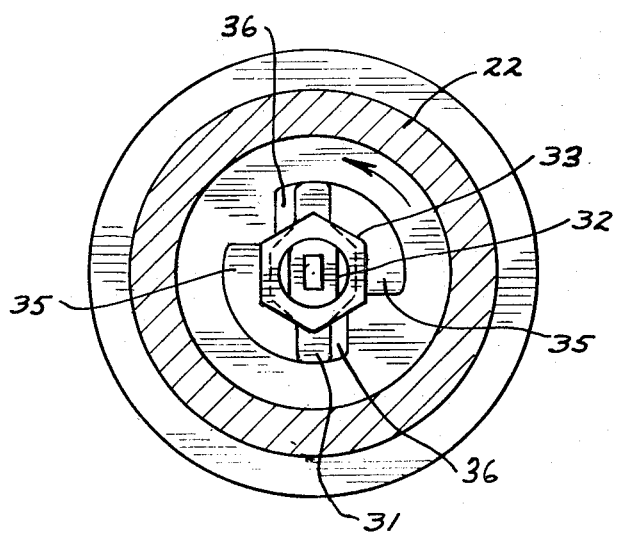
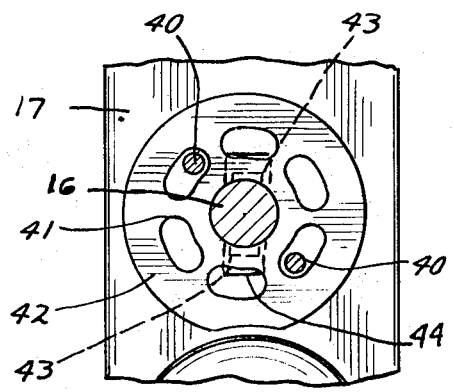

though in U.S. Pat. No. 3,796,074

LOCK FOR TRAILER HITCH COUPLER NUT

BACKGROUND OF THE INVENTION

1. Field of the Invention

The present invention relates to lockable nuts used primarily for trailer hitch couplers so that the trailer cannot be easily attached to a towing vehicle.

2. Prior Art

In the prior art there are various trailer couplers or hitch locks. For example U.S. Pat. No. 3,226,133 shows a trailer hitch locking device where a false ball is used for locking the coupler. This device is used when the trailer is uncoupled from the vehicle towing the trailer. Another type trailer hitch coupler lock is shown in U.S. Pat. No. 2,392,063 which will permit locking the trailer coupler when it is attached to the towing vehicle. Another type of lock for couplers is shown in U.S. Pat. No. 3,567,253. A special ball member that fits into the trailer coupling housing when the trailer is not mounted on towing vehicles and which can be used for locking or disabling a trailer hitch is shown in U.S. Pat. No. 3,492,023, and an additional safety lock for trailer couplers is also shown in Pat. No. 3,514,980.

Key lock devices that operate to either engage or disengage two relatively movable members that can be rotated are common in locks for gas caps. An example of such a construction is shown in U.S. Pat. No. 1,702,205. Theft preventing devices for locking spare tires in place which operate on a key lock principal are shown and used in U.S. Pat. Nos. 1,678,174; 1,516,453; and 1,635,228. In addition, U.S. Pat. No. 3,540,245 shows a tamper proof lock nut for mounting wheels onto a car.

Reference is also made to the copending application of Vincent H. Murphy, Ser. No. 220,355, filed Jan. 24, 1972 entitled Lock For Trailer Hitch Coupler, and assigned to the same assignee as this application. The Murphy application shows a locking nut of different lock construction.

SUMMARY OF THE INVENTION

The present invention relates to a lockable nut that may be used on a trailer hitch coupler to prevent the loosening of the nut when the coupler is attached to the automobile or when it is unhitched from an automobile or other towing vehicle. The device comprises a pair of members that are mounted relative to each other, one comprising an outer housing and another comprising an inner member that has a threaded center opening forming a nut that will thread onto the normal coupler bolt of a ball type trailer hitch coupler (as shown).

A key lock device is used for moving a cam member which actuates locking pins on the inner portion to a position wherein they will extend out through the bottom of the inner portion into openings in a washer that is prevented from rotating with respect to the trailer hitch coupler so that the nut portion is prevented from rotating. The same pin members are used for providing the disengageable drive between the inner nut member and the outer housing of the nut.

In the locked position, when the pins extend into the openings in the washer for locking purposes, the drive is disengaged, and the outer housing of the nut will turn freely relative to the inner nut member.

When the key lock is used to move the cam to its unlocked position, the pins will be permitted to retract away from the slots in the washer that normally keeps the nut from rotating. The pins include drive portions that engage provided interlocking pockets on the outer housing to effect a drive connection between the outer housing and the inner nut portion. At this time then, when the outer housing is rotated it will drive the inner nut portion to permit the nut to be loosened.

The pins provide a positive lock for the nut in the locked position and a positive drive between the inner nut member member and the outer housing in their unlocked position. Thus there is little chance that external members could be used for jimmying the nut and making it come loose when it is locked.

Therefore, the present invention comprises an easily lockable nut for use on trailer couplers and similar items where a theft proof nut is desired. The nuts are simple to manufacture and therefore low in cost, and can be used with the trailer either coupled to a towing vehicle or uncoupled from the vehicle.

BRIEF DESCRIPTION OF THE DRAWINGS

FIG. 4 is a sectional view taken substantially on the same line as FIG. 2 with the unit in its unlocked position;

FIG. 5 is a sectional view taken as on line 5—5 of FIG. 4;

FIG. 6 is a sectional view taken as on line 6—6 in FIG. 4; and

FIG. 7 is a sectional view showing a typical lock washer used for locking the inner nut member with respect to the trailer hitch coupler.

DESCRIPTION OF THE PREFERRED EMBODIMENT

Figure 1:
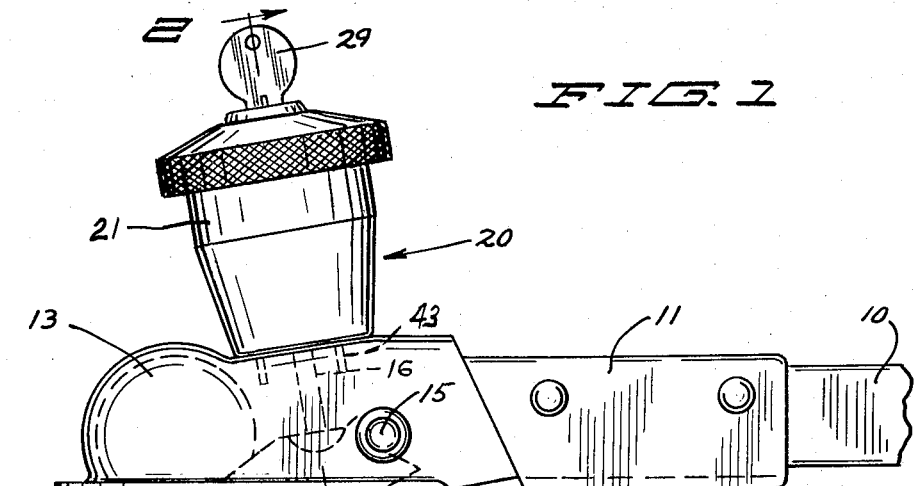
FIG. 1 is a side elevational view of a trailer hitch coupler having a coupler nut made according to the present invention installed thereon.

A trailer hitch pole illustrated fragmentarily at 10 has a hitch coupler assembly 11 of usual design at the outer end thereof designed to fit onto a coupler ball 12 that will be mounted onto the trailer hitch of an automobile or other towing vehicle. The coupler 11 includes a ball socket portion 13, that will receive the ball 12, and a locking lever or jaw 14 that is mounted on a suitable pivot pin 15 on the coupler housing. The jaw 14 is moved about its pivot to lock against the underside of ball 12 as shown in FIG. 1 through the use of a coupler bolt 16, that extends through the upper wall 17 of the coupler 11, and is threadably controlled by a coupler nut assembly illustrated generally at 20. The nut assembly is made so that it can be made tamper proof in accordance with the present invention. The nut assembly 20 permits locking the coupler when the ball 12 is in place in the coupler socket 13 or removed from the coupler.

The coupler nut assembly 20 includes an outer case or housing 21 that has an upper hand grip-cam portion 22 and a lower portion 23. The outer case 21 has an interior chamber in which an inner nut member 24 is rotatably mounted, and the inner nut member 24 is held inside the lower portion 23 by an annular shoulder or lip indicated generally at 25 at the lower end of the outer housing. The nut portion 24 is retained inside the interior cavity of the housing 21, and has a threaded interior bore 26 that is threadably mounted on the bolt 16. The nut member 24 is surrounded by the housing except for one exposed surface of the nut member at the bottom of the coupler nut assembly.

Figure 2:
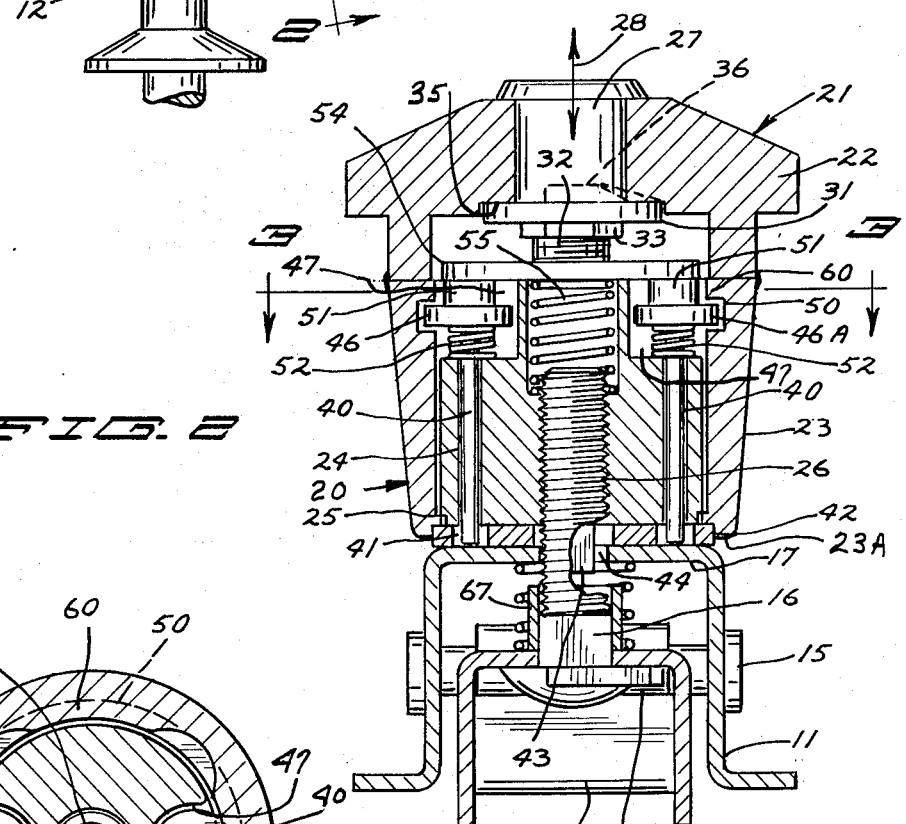
FIG. 2 is a sectional view taken as on line 2—2 of FIG. 1 with the nut in its locked position.

The upper portion 22 of the housing 21 mounts a key lock of usual design which has an outer housing 27 that is mounted so that it can slide in an out along the axis 28 of the nut housing but will not rotate about this axis when a key 29 is used in the unit. The key 29 operates an internal tumbler member 32 of the lock in the usual manner which has a locking cam bar 31 drivably coupled thereto and held in place with a nut 33. It should be noted that when the outer lock housing 27 slides along its longitudinal direction indicated by axis 28, the interior tumbler assembly 32, which extends through the outer housing 27 also moves in and out with respect to the outer housing 21. However, the cam locking bar 31 controls the movement of the outer housing 27, and therefore the inner member 32, by engagement with camming surfaces defined on the end wall of the chamber inside the housing 21. These camming surfaces are perhaps best seen in FIG. 6, and include a two low cam surface portions 35 and two high cam portions 36. The low cam surfaces are joined to one of the high cam surfaces, respectively, with ramp surfaces. In the low cam position as shown in FIG. 2, the locking cam bar 31 is underneath the low cam surface portions 35 and the lock assembly including the inner member 32, extends into the interior of the housing 21 the maximum amount. In a high cam position shown in FIG. 4, the locking bar is rotated 90° (this is also shown in FIG. 6) and the outer key housing 27 can move outwardly from the nut housing 21 as shown in FIG. 4 so that the cam bar 31 and the inner member 32 move outwardly to the position shown in FIG. 4.

The inner nut member 24, which is rotatably mounted inside the nut housing 21, includes means to selectively effect a drive connection between the outer housing 21 and the inner nut member 24. When the drive connection is disengaged a positive lock to prevent rotation of the nut member 24 with respect to the coupler bolt 16 is then provided. As shown, the nut member 24 has a pair of locking pins 40 slidably mounted therein for movement along the axis of the locking pins generally in the direction of axis 28. These locking pins 40 are spaced diametrically on the nut, and have shanks extending through the inner nut member 24. The pin shanks are positioned to align with slot openings 41 in a washer 42 that is mounted on the top wall 17. The washer 42 includes locking tabs 43 that extend through slots 44 in the upper wall 17 (see FIG. 2 and 7). These locking tabs 43 in the slots 44 prevent the washer 42 from rotating with respect to the upper wall 17 of the coupler, and thus it can be seen when the pins 40 are extending into the openings 41 the nut member 24 cannot turn with respect to the bolt 16 more than the length of the slot openings. The pins form lock dogs for prevention of rotation of the inner nut member with respect to the bolt. It should be noted that the bolt 16 also includes a tab 45 that will prevent the bolt 16 from turning inside the jaw 14.

The pins 40 in addition to the elongated shank portion have driving head members 46 at the upper ends thereof. The heads 46 are mounted in larger recesses 47 in the nut member 24 and will move axially. The heads 46 are enlarged annular flanges that are of sufficient diameter so that they protrude outside of the normal pheriphery of the inner nut member 24 and the outer edge portions of these drive heads 46 indicated at 46A extend into an annular groove 50 defined in the interior surface of the lower portion 23 of the coupler nut housing 21. It should be noted that the recesses 47 provide open edges so that the pin heads 46 protrude outwardly beyond the edge of the nut housing. The pins 40 also have actuator buttons 51 at the upper ends thereof. The actuator buttons 51 extend upwardly from the heads 46.

The pins 40 are spring loaded in upwardly direction or in other words toward the upper portion 22 of the nut housing with springs 52 positioned between the heads 46 and the surfaces at the bottom of the recesses 47 in the nut member and these springs spring load the pins 40 upwardly, or in other words, in direction away from their locking position as shown in FIG. 2.

The buttons 52 are of sufficient height to extend upwardly to be substantially on a level with the upper surface of the nut member 24 when the pins are in position as shown in FIG. 2 with the heads 46 aligned with the annular recess 50. However, the pins 40 have to be held in this position, and a large washer 54 is mounted inside the interior cavity of the nut housing 21 and the washer 54 engages the actuator buttons 51 on both of the pins 40 and retains the pins in their depressed locking position shown in FIG. 2 when the cam bar 31 is in its lock position of FIG. 2. It can be seen that the end of the inner member 32 of the lock bears against the upper surface of the washer 54 and holds this washer down against the buttons 51 and thereby holds the pins 40 in their locked position with the ends of the pins extending out through the bottom of the nut member 24 and into the openings 41.

A spring 55 is also mounted in an interior recess in the center of the nut member 24 and this spring 55 bears against the bottom surface of the washer 54 to urge it in upwardly direction as well.

Figure 3:
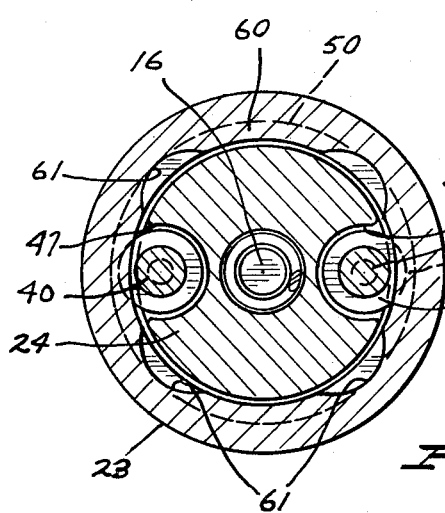
FIG. 3 is a sectional view taken as on line 3—3 of FIG. 2.

The lower portion 23 of the coupler nut housing has an annular flange 60 that forms the upper wall above the groove 50 (see FIG. 3). This flange 60 has four receptacles 61 defined therein and which extend outwardly from the inner edge of the flange so that the outer edges of the receptacles 61 are substantially in line with the outer edge of the groove 50. As shown in FIG. 3, the heads 46 of the pins extend under this flange 60, when the pins are in locked position and the outer housing 21 can turn with respect to the inner nut 24 freely because there is no driving connection between the nut 24 and the outer housing 21. The lock member 27 will also rotate of course with the outer nut housing 21 and the end of inner tumbler member 32 will rotate on the upper surface of the washer 54 without any difficulty. The washer 54 and inner nut will not turn.

However, as shown in FIG. 4 when the key 29 is turned to release the inner tumbler member 32 the cam lock bar 31 will be rotated 90° to the high cam position defined by surfaces 36. The spring 55, and also the springs 52 will urge the washer 54 and the pins 40, respectively, upwardly with respect to the nut member 24 and this spring loading will urge the pin heads 46 up against the underside of flange 60. When the outer housing then is rotated to position wherein the pin heads 46 and two of the recesses 61 align, the pin heads will snap upwardly into the aligned recesses 61 and the outer edge portions 46A of the pin heads will go into the recesses 61 as shown in FIG. 4. The outer housing 21 will then be drivably connected to the inner nut member. In other words the surfaces defining the receptacles 61 will engage the edges of the pin heads 46 in portions 46A and there will be a driving connection between the outer housing assembly 21 and the inner nut member 24 so that the inner nut member can be rotated. It should also be noted that when the unit is in its position as shown in FIG. 4 the pins 40 are withdrawn from the openings 41 in the retainer washer 42 and the entire nut assembly then will be driven as a unit and operate as a nut by turning the outer housing to thread the nut member 24 with respect to the bolt 16. This permits loosening or tightening the nut on the bolt. The outer lock housing 27 moves upwardly as shown in FIG. 4. away from the upper surface of the upper member 22 of the housing in this unlocked position.

When the device is again to be locked, the key 29 and the housing 27 will be pushed down (the ends of pins 40 will have to be aligned with slots 41 before the lock can be depressed), and the key 29 rotated to the locked position with the cam bar 31 under the low cam surfaces 35 on the inner end surface of the receptacle in the outer nut housing 21. The pins 40 will be moved to their position as shown in FIG. 2 so that the outer portions 46A of the pin heads 46 move down into alignment with the groove 50. The edge portions 46A no longer engage the receptacles 61 and the outer nut housing 21 can be freely rotated with respect to the inner nut member 24. It should be noted that the unit cannot be locked or in other words the lock bar 31 cannot be moved to its low cam position until the pins 40 enter the slots 41 of the washer 42. The use of slots makes alignment relatively easy. Once the pins extend into the slots 41 it is insured that the inner nut member 24 is held positively from rotation. The washer 42 is held from rotation by lugs 43 so that the nut 24 cannot be unfastened from bolt 16. The lower portion 23 of the outer housing 21 has an annular flange 23A that surrounds the edge of washer 42. This prevents the use of bars or picks to loosen the washer.

If desired, a small collar or tubular lock member 67 can be mounted over the bolt 16 below wall 17, and then the coupler can be locked even without the ball 12 in place. The nut can be tightened until the bolt 16 draws up against the lock sleeve 67 so that the sleeve 67 is against the undersurface of the top wall 17 so that the unit can be tightly held. When the jaw is in its raised position a ball cannot be inserted. With the nut locked as explained the trailer cannot be attached to a vehicle and stolen. A spring also may be used on the bolt 16 below the coupler wall 17 to cause the jaw 14 to open as the nut is unthreaded.

The nut unit is quite simple to make, and it should be noted that the spring 55 is of sufficiently large inner diameter to clear the bolt 16. The springs acting on the washer 54 and the pins 40 urge the lock housing 27 and pins 40 to unlocked position at all times so that whenever the key is operated to turn the cam lock bar 31 to its unlocked position the key housing 27 will slide upwardly to its position as shown in FIG. 4. The unit then will be unlocked, or in other words there will be a driving connection between the outer nut housing and the nut member 24 and as soon as the edge portion 46A of heads 46 snap into receptacles 61 so that the nut can be threaded onto or removed from the bolt 16. Again it is to be understood that the outer lock housing 27 does not rotate with respect to the outer nut housing, but merely slides in axial direction so that the rotation of the key 29 will cause the inner member 23 of the lock to rotate the cam lock bar 31 between its high cam and low cam positions.

The inner nut member or housing is assembled inside the outer housing 21 before the two portions 22 and 23 are welded together. The inner nut member or housing is assembled in place and rotatably held while being completely shielded.

What is claimed is:

1. An antitheft nut assembly for attaching to a bolt member including an outer housing, an inner housing rotatably mounted inside said outer housing, means on said inner housing defining an opening threadable onto said bolt, lock dog means carried by said inner housing and movable from a locking position wherein said lock dog means protrudes outside said inner housing to an unlocking position, means engageable by said lock dog means to prevent rotating said lock dog means and inner housing with respect to said bolt a substantial amount with the lock dog means in said locking position, and complemental drive means on said inner and outer housings positioned to be drivably engaged with respect to each other when lock dog means is moved to its unlocking position and disengaged with the lock dog means protruding outside said inner housing.

2. The combination as specified in claim 1 wherein said lock dog means comprises pin means slidable mounted in said second member along an axis substantially parallel to the axis of the bolt, said pin means protruding out beyond the bottom surface of said inner housing, a retainer means mounted below said second member, and means to hold said washer means from rotation with respect to said bolt, said retainer means having a plurality of openings therein to receive said pins when said pins are in said locking position.

3. The combination as specified in claim 2 and cam operated lock means mounted on said outer housing and movable to and from positions wherein said cam lock means moves said pins between said locking and unlocking positions.

4. The combination as specified in claim 3 and spring means urging said pins to their unlocking position.

5. The combination as specified in claim 3 wherein said pins include head portions projecting outwardly from the main part of the pins, and receptacle means defined in portions of said outer housing, said portions of said pins engaging said receptacle means to effect said driving connection when said pins are in said unlocking position.

6. A theft preventive nut assembly for use on a trailer coupler having a bolt used for attaching the coupler to a towing vehicle including an outer housing, an inner housing retained within said outer housing and rotatably mounted with respect thereto, said inner housing being exposed only on one surface and having an opening defined therein threaded to threadably receive said bolt, first and second means mounted on said inner housing and said coupler movable between a locked position and an unlocked position, said first and second means engaging in lock position to prevent substantial rotation of said inner housing with respect to said bolt, third and fourth means on said inner housing and said outer housing, said third and fourth means being relatively movable from an unlocked position where the inner and outer housings are not drivably engaged to an unlocked position to effect a rotational drive connection between said inner and outer housings, and lock means to substantially simultaneously move one of said first and second means and one of said third and fourth means to their respective locked positions.

7. The combination as specified in claim 6 wherein said first means comprises at least one pin slidably mounted in said inner housing, an end portion of said pin protruding from said inner housing in the locked position, and said second means comprising a receptacle defined in a member that does not rotate with respect to said bolt, said receptacle being positioned to receive the end portion of said pin when the inner housing is threaded onto said bolt.

8. The combination as specified in claim 7 wherein said third and fourth means comprise interlocking projection and receptacle means, one of said third and fourth means being defined on said pin and the other of said third and fourth means being defined on said outer housing.

9. The combination as specified in claim 8 wherein said pin is slidably mounted in said inner housing and spring means urging said pin toward said unlocked position.

* * * * *

PO-1050
(5/69)

UNITED STATES PATENT OFFICE
CERTIFICATE OF CORRECTION

Patent No. 3,796,074      Dated March 12, 1974

Inventor(s) Albam M. Vik

It is certified that error appears in the above-identified patent and that said Letters Patent are hereby corrected as shown below:

Column 3, line 8 "an" should be--and--. Column 6, line 30, (Claim 2, line 2) "slidable" should be--slidably--; Column 6, line 31, (Claim 2, line 3) take out "second member" and insert --inner housing--; Column 6, lines 34 and 35, (Claim 2, lines 6 and 7) take out "second member" and insert--inner housing--; Column 6, line 51, (Claim 5, line 6) take out "driving connection" and insert--drivable engagement--; Column 6, line 63, (Claim 6, line 11) "lock" should be--locked--; Column 6, line 67, (Claim 6, line 15) take out "an unlocked" and insert--a locked--.

Signed and sealed this 17th day of September 1974.

(SEAL)
Attest:

McCOY M. GIBSON JR.            C. MARSHALL DANN
Attesting Officer              Commissioner of Patents